Figure 1:
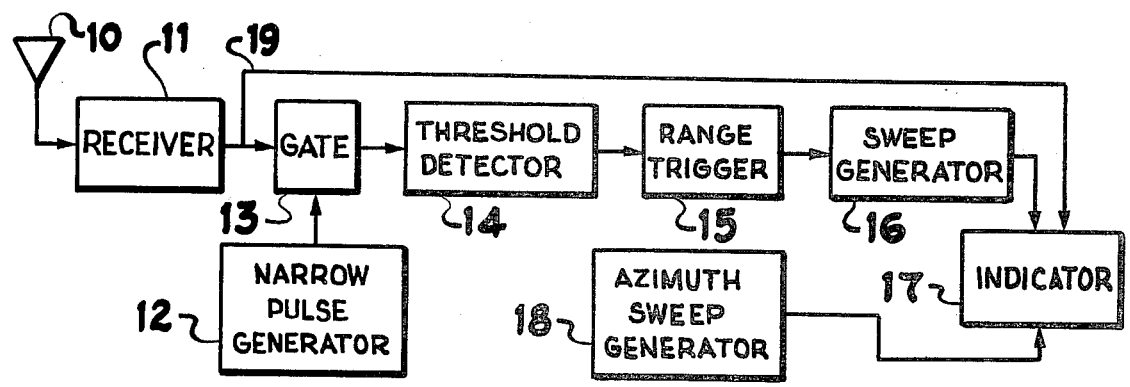

United States Patent [19]

Fales, III

[11] 4,176,357
[45] Nov. 27, 1979

[54] PASSIVE METHOD AND APPARATUS FOR RADAR LOCATING AND PARASITIC SURVEILANCE

[75] Inventor: David Fales, III, Baltimore, Md.

[73] Assignee: Martin Marietta Corporation, Bethesda, Md.

[21] Appl. No.: 4,563

[22] Filed: Jan. 25, 1960

[51] Int. Cl.$^2$ .............................................. G01S 5/02
[52] U.S. Cl. .............................. 343/112 R; 343/18 E
[58] Field of Search ........................ 343/5, 11, 13, 5 R, 343/18 E, 112 R, 18, 112

[56] References Cited

U.S. PATENT DOCUMENTS

| 2,971,190 | 2/1961 | Busignies | 343/112 R |
| 3,212,091 | 10/1965 | Bissett et al. | 343/18 E X |

*Primary Examiner*—T. H. Tubbesing
*Attorney, Agent, or Firm*—Gay Chin

EXEMPLARY CLAIM

1. Receiving apparatus capable of passively locating a remote emitting radar comprising, receiving means for intercepting and amplifying the pulses and echo signals from the radar so as to produce a video output, gate circuit means connected to receive said video output, gate control circuit means connected to energize said gate circuit means when reception of unreflected main power pulses from the emitting radar is anticipated so that the output of said gate circuit will be a series of pulses corresponding to said main power pulses, range sweep circuit means connected to receive said series of pulses from said gate circuit means and to produce a range sweep output for each of said pulses, indicator means connected to receive said range sweep output, circuit means designed to produce an azimuth sweep output in synchronization with each of said main power pulses received with maximum amplitude from the emitting radar, said azimuth sweep circuit means being connected so as to introduce said azimuth sweep output to said indicator means, and means for connecting said video output of said receiving means to said indicator means, said indicator means being designed to correlate said range sweep output, said azimuth sweep output, and said video output so as to present an indication representative of the radar map that could be observed at the emitting radar whereby the location of the emitting radar can be passively determined and the area surrounding the radar can be kept under passive surveillance.

20 Claims, 7 Drawing Figures

PASSIVE METHOD AND APPARATUS FOR RADAR LOCATING AND PARASITIC SURVEILANCE

This invention relates to passive methods and means for locating pulse type radar emitters and for maintaining surveillance of the area surrounding the radar. More particularly, this invention relates to passive receiving methods and apparatus for intercepting the output pulses and multipath echoes or ground clutter of a distant radar and utilizing this information in a comparison process so that the location of the radar may be determined and/or a representation of the area illuminated by the radar can be produced for observation by a human or by automatic means.

In the past, the position of an unlocated radar has been determined by placing beam intercepting receivers at two or more substantially separated points in order to locate the radar by triangulation. This method, of course, is seriously restricted in that narrow beam receiving antennas are required and accurate geographical information pinpointing the two separated points must be obtained from reliable survey and/or navigational information before the triangulation calculations can be performed. Furthermore, the prior art emitter locators were not capable of converting the received radar beams into a representation of the area surrounding the radar so as to keep this area under surveillance by passive means.

It has been found by experimentation that the unreflected main power or "main bang" pulses and the reflected signals in the form of target echoes and ground clutter of an emitting radar can be received at a distant location and that the main power pulses are generally received at this location with much greater strength than the echoes or ground clutter. This has been found to be true even during the time that the antenna of the radar is not pointed towards the receiving location. Thus all of the information available at the radar due to its own transmission is also available with a distorted range condition at the distant receiver. The prior art emitter locators and reconnaissance receivers such as the triangulation system mentioned hereinbefore have used only the main power or directly transmitted pulses of the radar and have generally ignored the information available from the target echoes and ground clutter that are also received.

The present invention is concerned with the utilization of the unreflected power pulses and the reflected signals received from a remote radar so that the raw data information contained therein is converted into useful information for locating the radar, reproducing the ranging or radar map information thereof, maintaining passive surveillance of the radar-illuminated area, or any combination of these. The foregoing operations can be performed immediately, or the raw data information can be recorded so that the operations can be performed at a later time.

According to one embodiment of the present invention, the pulses and multipath echoes such as targets or ground clutter of a distant radar are utilized at a receiver so as to effectively reproduce the map presentation such as the PPI picture that could be actually observed at the radar. The radar map at the receiver will reveal the echoes and ground clutter surrounding the distant radar thus making it possible to locate the radar or to maintain surveillance over the area illuminated by the radar or both. In addition, it is possible to add a correction factor to the signals received from the radar so that a reasonably accurate map can be advantageously reproduced if this should be desirable.

In particular, the embodiment of this invention mentioned in the previous paragraph is designed to advantageously utilize a radar picture presentation such as a PPI or "B" scan which is triggered by the output pulses of the unknown radar to initiate the range sweep thereof and which is synchronized to scan in azimuth at the same rate as the radar. The radar picture presentation that is thus produced will have slightly distorted range information thereon but will be a reasonable facsimile of the presentation that could be actually realized at the unknown radar. The distortion of course is due to difference in path lengths for the direct emitter signals and the reflected or echo signals. At this point, the location of the unknown radar could be determined by comparing the presentation at the emitter locating receiver with a previously recorded radar or geographical map or the like and/or the area illuminated by the radar could be kept under passive surveillance. However if an accurate reproduction of the radar picture is desired, the range sweep of the receiver can be modified by appropriate circuitry to remove the inaccuracies resulting from the differences in path length. For instance, when the receiver of this invention and the unknown radar emitter are separated by a distance substantially greater than the range from radar to target, the range sweep need only be corrected by a factor of $1/(1-\cos\theta)$ where $\theta$ is the angle defined by the line between the radar and the receiver and the line between the radar and the target. One system using the aforementioned correction factor will be described in the detailed description hereinafter, but it is obviously within the scope of this invention to use other correction factors as the mathematics and circumstances of any given situation may dictate. Ideally, the method and means according to this invention requires no position or azimuth information and can employ a simple dipole or stub as a receiving antenna. Under some circumstances directive antennas may be useful, however, in order to facilitate the orientation of the received information or to block out undesired signals from other directions.

Figure 2:
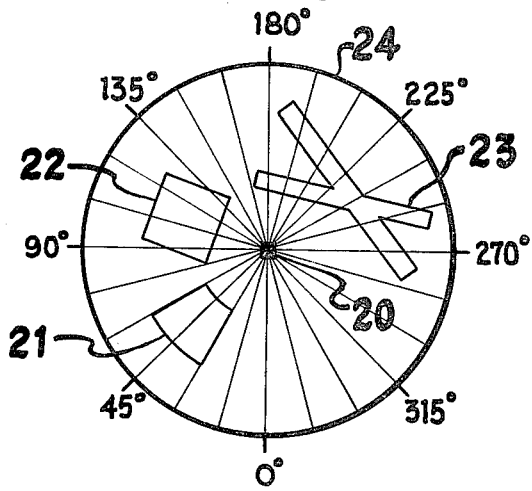
Figure 3:
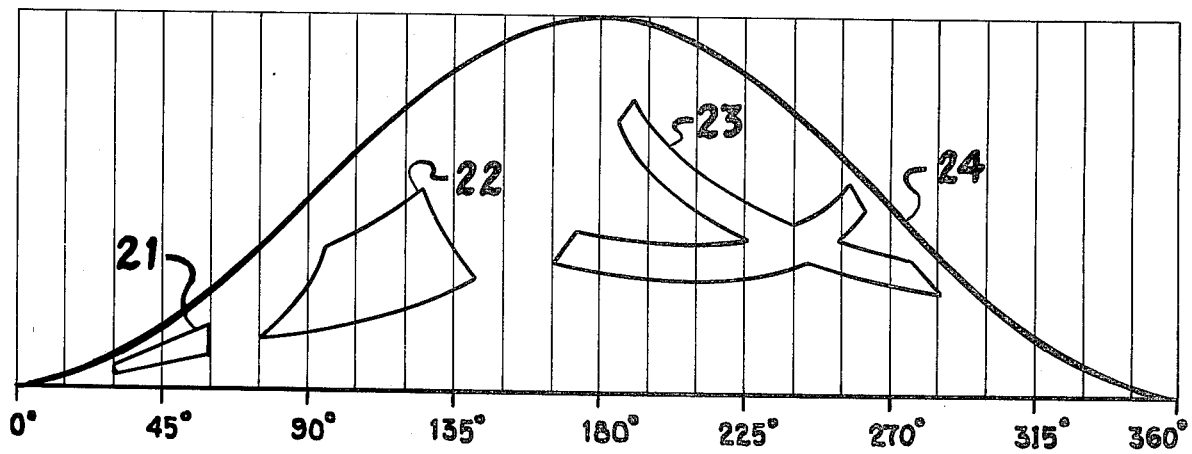
Figure 4:
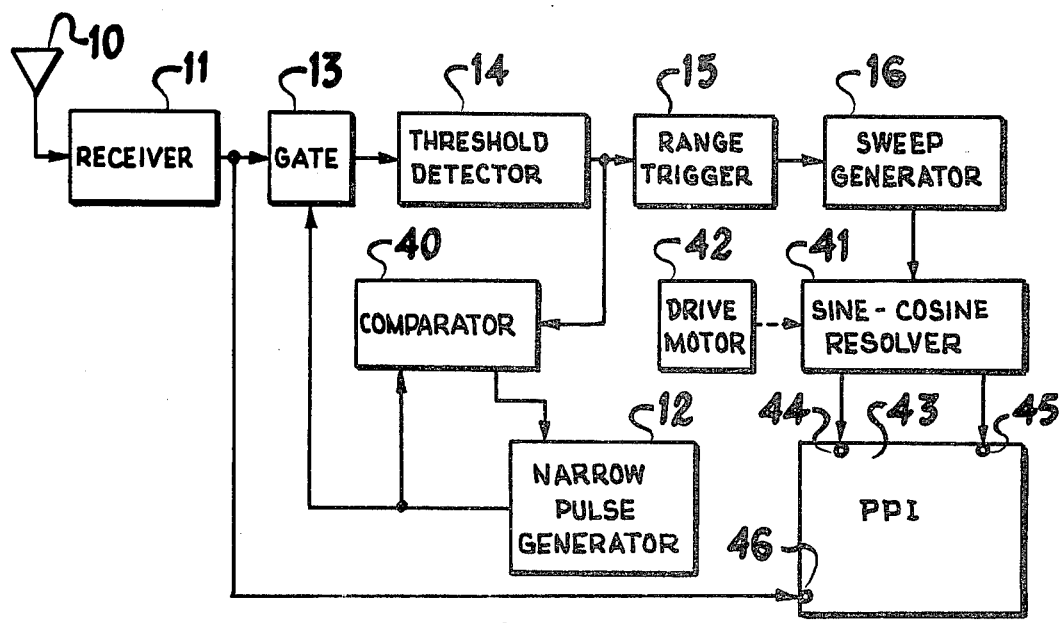
Figure 5:
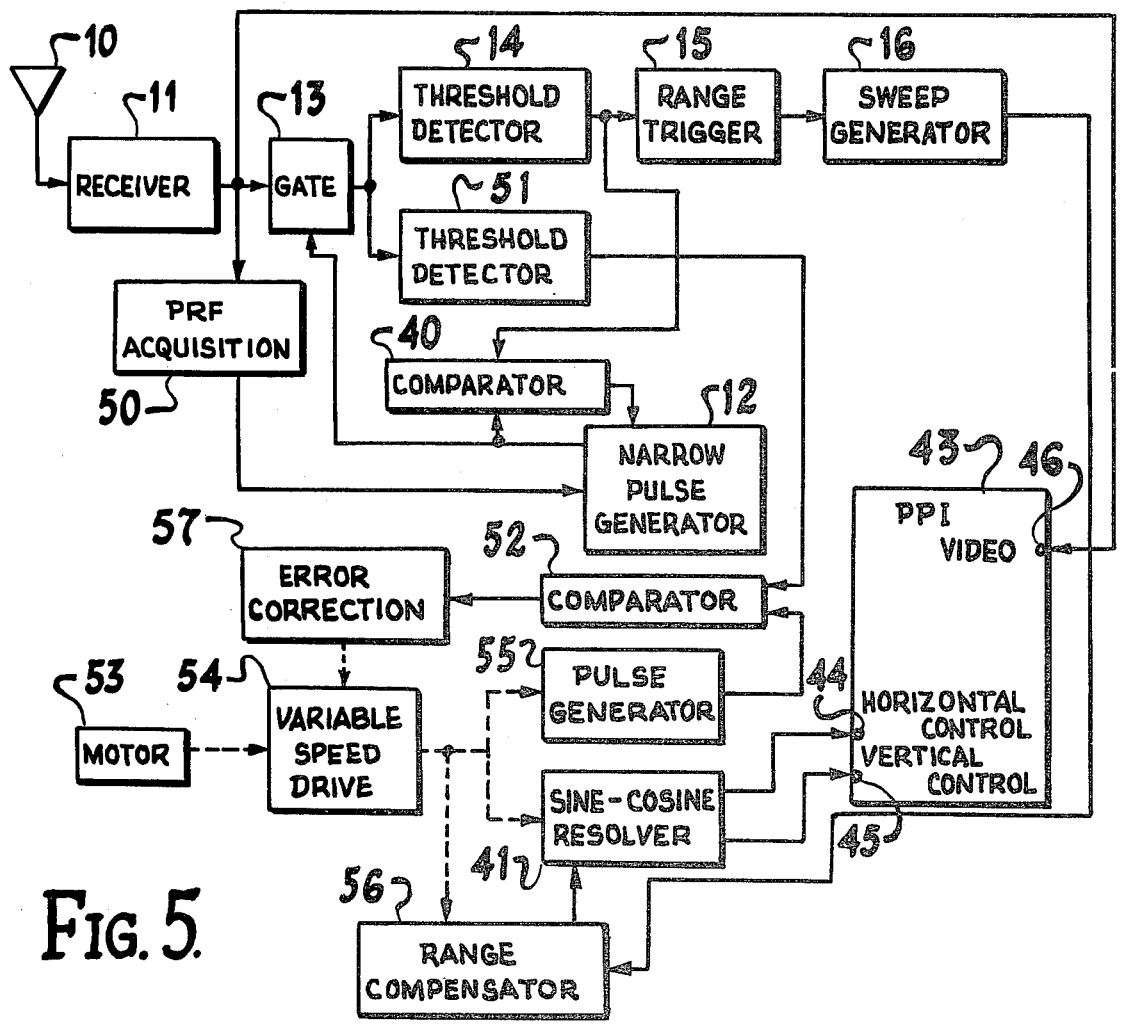
Figure 6:
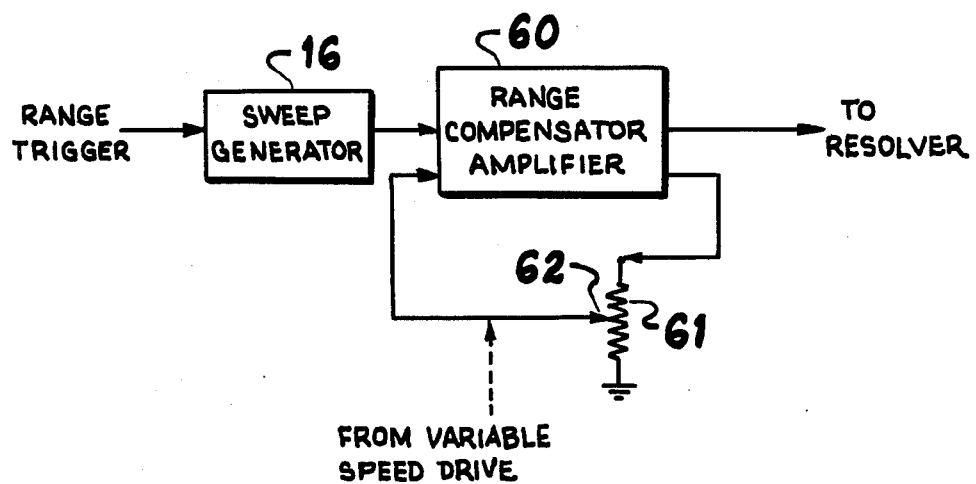
Figure 7:
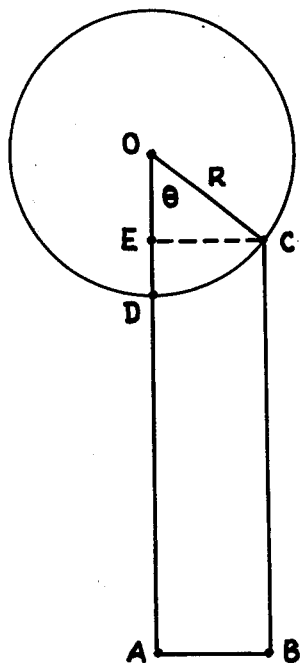

Further understanding of this invention can be secured from the following detailed description with reference to the drawings in which:

FIG. 1 is a block diagram representing one embodiment of the invention,

FIG. 2 is a hypothetical PPI presentation that could be observed at the remote radar, FIG. 3 is the "B" scan presentation of FIG. 2 as seen at the receiver according to FIG. 1, FIG. 4 is a block diagram of an embodiment of the invention for use with PPI presentation, FIG. 5 is a block diagram of a receiver system according to this invention including range error correcting circuitry, FIG. 6 is a more detailed block diagram of part of FIG. 5, and FIG. 7 is a geometric diagram illustrating the mathematics involved in obtaining one range correction factor.

As has been mentioned hereinbefore, it has been found by experimentation that the unreflected main power or "main bang" pulses and the target echoes and ground clutter of an emitting radar can be received at a distant location. In addition, the main power pulses are generally received at this location with greater strength than the echoes or ground clutter even though the antenna of the radar is not pointed at the receiving location, and this invention contemplates utilizing this difference in received signal strengths for at least a portion of the azimuth sweep of the radar in order to reproduce a usable representation of the information available at the radar as a result of its own transmission. This representation can be obtained by any one of several methods such as by recording the received power pulses and echoes on a video tape or a film strip and using this recording to produce a handdrawn map or to operate a system similar to the one described hereinafter, or to operate such a system directly from the received information, or any of the many variations and combinations that are obviously within the spirit of this invention.

In one embodiment of this invention as shown in FIG. 1, the "main bang" pulses and the reflected echoes of the radar to be located are received at antenna 10 and are subsequently detected and amplified by receiver 11 so as to produce a video output. Receiver 11 may include well known local oscillator and video amplifier circuitry. In addition, receiver 11 could be scanned in frequency and set to lock on the particular frequency of a received signal if this arrangement should be desired. Narrow pulse generator 12 supplies a narrow "on" pulse to gate circuit 13 with approximately the same repetition rate as that employed by the unknown radar, and, obviously, any of a variety of means can be employed to control pulse generator 12. For example, a trigger having a controlled delay might be introduced to actuate narrow pulse generator 12, the pulse generator itself may be adapted to be actuated by received pulses or the like. In some installations the arrangement may be simplified to such an extent that even a visual system may be employed wherein an operator can compare the PRF of the unknown radar and the pulse output of generator 12 on an oscilloscope and then adjust the frequency and phase of generator 12 until gate circuit 13 is actuated at the desired times. Narrow pulse generator 12 is then set to introduce narrow "on" signals to gate circuit 13 at the time that the "main bang" pulses of the unknown radar are due to appear so that the system will not be sensitive to spurious signals. Thus the output of gate circuit 13 during normal operation is simply a series of pulses corresponding to the "main bang" or main power pulses received from the unknown radar. The output pulses of gate circuit 13 are then fed into threshold-detector 14 which produces an output pulse for each "main bang" received from gate 13. The output pulses from threshold-detector 14 are then fed to range trigger circuit 15 which in turn triggers sweep generator circuit 16 into operation once for each "main bang" pulse received. Sweep generator 16 will then introduce a range sweep to indicator 17.

Azimuth information is supplied to indicator 17 by azimuth sweep circuit 18 with the azimuth sweep being initiated each time that an unreflected "main bang" pulse of maximum strength is received which occurs when the transmitting antenna of the radar is pointed directly towards the receiver of this invention. Several synchronizing means that are well known in the art could be employed to control the operation of azimuth sweep generator 18. For example, another threshold detector set to produce an output pulse for each maximum "main bang" pulse received could be connected to directly actuate sweep generator 18, or delayed trigger circuitry could be used to actuate generator 18, or the like. The simplest arrangement of course would be a visual system wherein an operator would monitor the amplitudes of the received "main bang" pulses and the azimuth sweep triggers and would then adjust azimuth sweep circuit 18 so that the azimuth sweep of indicator 17 would be synchronized with the azimuth sweep of the radar. The video output information would be fed from receiver 11 to indicator 17 via video connection 19. Thus the video, azimuth, and range information could be recorded or presented by indicator 17 in a well known manner such as by use of oscilloscope presentations, "B" scans, PPI presentations, pen recorders, or the like.

FIG. 2 shows a hypothetical PPI presentation with what might be typical ground clutter as could be observed at the unknown radar. If a "B" scan presentation were being used for indicator 17 in FIG. 1, the PPI scan information shown in FIG. 2 would appear on the "B" scan as shown at FIG. 3. The term "B" scan is herein intended to mean a rectilinear oscilloscope presentation having the range sweep on one axis and the azimuth sweep on another axis perpendicular to the range axis. In FIG. 3, the range is swept vertically and the azimuth is swept horizontally while the video information is plotted on the graph thus formed. The ground clutter patterns of FIGS. 2 and 3 are purely hypothetical of course with the unknown radar being indicated at 20 in FIG. 2 and ground clutter echoes being shown at 21, 22, and 23 in both FIG. 2 and FIG. 3. In order to illustrate the correlation of points on FIG. 3 with respect to FIG. 2, a hypothetical ground clutter circle has been indicated at 24 in FIGS. 2 and 3. Ground clutter circle 24 as shown in FIG. 3 shows the range distortion that would be present at the receiver as a result of the path length difference for the received power pulses and echoes. If some knowledge of the area surrounding the radar is known at the receiver, the radar can be approximately located from the "B" scan information of FIG. 3.

FIG. 4 shows an embodiment of this invention that is somewhat similar to FIG. 1 but which is particularly adapted to automatically control narrow pulse generator 12 and to produce a PPI type of presentation at the receiver. Elements 10, 11, 13, 14, 15, and 16 in FIG. 4 operate in a manner substantially similar to the corresponding numbered elements in FIG. 1 and therefore a description of their operation will be omitted for FIG. 4 for purposes of clarity.

In FIG. 4, the output pulses of threshold detector 14 are additionally fed into narrow pulse generator 12 by way of a feedback control circuit such as comparator 40. Comparator 40 receives the output pulses of both threshold detector 14 and narrow pulse generator 12, compares these pulses and, if the two sets of pulses do not coincide, produces an error signal to correct the phase of the narrow pulse generator output pulses so that they will coincide with the detector output pulses. Thus, once pulse generator 12 has been initially actuated, the feedback system controls pulse generator 12 to keep it "locked in" with the received "main bang" in order to activate gate 13 for a short time before and a short time after the anticipated reception of a "main bang" pulse. By this system, it can be seen that each main power pulse that is received will activate pulse generator 12 and subsequently gate 13 so as to allow detection of the next main power pulse received.

The range sweep output of sweep generator 16 of FIG. 4 is fed to sine-cosine resolver 41 which is rotated by a driving means in coincidence with and at the same angular rate as the azimuth sweep of the unknown radar. Several devices and arrangements are available in the art to provide for and control the driving means such as by sensing the maximum "main bang" pulses received and using this information with a feedback system to directly control the speed of a drive motor, or by varying the coupling between a driving motor and the resolver (such as is shown in FIG. 5), or the like. If it should be desirable, of course, a very simple arrangement could be provided by having an operator monitor the azimuth sweep of the receiver and the amplitude of the received "main bang" signals and then manually control the speed of a drive motor such as 42 in FIG. 4 until the two azimuth sweeps are in synchronism.

When drive motor 42 is in synchronism with the azimuth sweep of the unknown radar, the sine-cosine resolver 41 will then divide the output of sweep generator 16 into horizontal and vertical components which are introduced into PPI circuit 43 at terminals 44 and 45. PPI circuit 43 then utilizes the horizontal and vertical sweep components in a well known manner in order to produce a sweep suitable for a PPI presentation. A radar map can be produced by the addition of the receiver video output which is introduced to PPI circuit 43 at terminal 46 and which can be used for intensity modulation for example. The PPI type of radar map then produced will be somewhat distorted in that the range information will be in a cardiod configuration but this information will be a reasonably interpretable reproduction of the PPI radar map that could actually be present at the unknown radar. However, the location of the unknown radar can be considerably facilitated by the use of the system shown in FIG. 4.

It should be noted that the presentation on PPI circuit 43 will be a mirror image of the PPI presentation that could be observed at the unknown radar if drive motor 42 is rotating in a direction opposite to that of the antenna of the unknown radar. If it should be desirable, this could be corrected by using any of several well known techniques. For instance, the correction could be effected by a simple mirror system or by using two directional antennas that are placed side by side so as to sense the direction of rotation of the antenna of the unknown radar. The rotation of motor 42 could then be corrected in accordance with this information. Furthermore, if it should be desired, the driving means could be entirely electronic rather than the mechanical drive shown in FIGS. 4 and 5.

FIG. 5 illustrates a receiver system similar to that described in FIG. 4 but including some additional features for nearly automatic system operation and for correcting range errors resulting from path differentials for the reflected and unreflected signals that are received. Unless described otherwise hereinafter, elements of FIG. 5 having like number references as elements of FIGS. 1 and 4 operate in the same manner as their counterparts.

FIG. 5 shows the connection of a PRF acquisition circuit 50 between receiver 11 and narrow pulse generator 12. PRF acquisition circuit 50 automatically scans a range of pulse repetition or PRF frequencies and locks on the phase sequence of the unknown radar. Acquisition circuit 50 will then initiate the operation of pulse generator 12 to start the operation of the system or to re-secure the system if a "lost signal" condition occurs. After the PRF has been secured and pulse generator 12 has been initiated, elements 12, 13, 14, 15, and 40 operate substantially the same as described for FIGS. 1 and 4.

Threshold detector 51 in FIG. 5 is connected to receive the "main bang" pulses from gate circuit 13 and is set to produce an output pulse only when the maximum amplitude "main bang" pulses are received which occurs when the pulses from the emitting antenna of the unknown radar are directed along the azimuth line that points directly at the receiving antenna of this invention. This maximum amplitude "main bang" signal that is received will hereinafter be referred to as the "main beam burst." The output pulses of threshold detector 51 as determined by these main beam bursts are then fed into comparator 52.

Motor 53 is mechanically connected to supply rotational power to variable speed drive 54 which might be a ball-disc integrator or a differential gearing arrangement for instance and which in turn supplies rotational power to sine-cosine resolver 41, pulse generator 55, and range compensator 56. Before reception of the radar signals, the variable speed drive 54 produces a rotational output at any arbitrary rate. Pulse generator 55 which may be mechanized in a number of well known ways is designed to produce an output pulse for each 360° of rotation of sine-cosine resolver 41 and these output pulses are introduced to comparator 52. Comparator 52 then compares the pulses corresponding to the main beam bursts from detector 51 and the output pulses from pulse generator 55, and produces an error signal proportional to the phase difference therebetween: This error signal actuates error correction circuit 57 which changes the rate of speed available from variable speed drive 54 until the output pulses from pulse generator 55 and the main beam bursts coincide at comparator 52. At this point, the rotational output of variable speed drive 54 is synchronized with the azimuth scanning rate of the emitting radar.

Also included in the system shown in FIG. 5 is range compensator circuit 56 which is mechanically connected to variable speed drive 54. For the situation wherein the receiver to radar range is much greater than the radar to target range, range compensator 56 would be designed to modify the range sweep output voltage from sweep generator 16 by a factor of $1/(1-\cos\theta)$ where $\theta$ is the angle subtended by the radar to target and radar to receiver lines. An exemplary circuit for producing this correction factor will be discussed in connection with FIG. 6 and the actual derivation of the correction factor will be explained later in connection with FIG. 7. After the range sweep waveform has been modified by the correction factor, this corrected waveform then energizes sine-cosine resolver 41 which in turn produces horizontal and vertical components as described for FIG. 4. These horizontal and vertical components are introduced to PPI circuit 43 at terminals 44 and 45, and the video output of receiver 11 is fed into PPI circuit 43 at terminal 46. PPI circuit 43 then utilizes the horizontal and vertical components and the video information to produce a radar map as is well known in the art. The radar map thus produced will contain relatively accurate range information and will be a reasonable facsimile of the PPI presentation that could be present at the unknown radar itself. The location of the radar and passive surveillance of the area around the radar can both be realized with a relatively high degree of accuracy by the system shown in FIG. 5.

FIG. 6 illustrates a typical section of an exemplary circuit means for range compensator 56. Sweep generator 16 which has been triggered at the same repetition rate as the PRF of the unknown radar will introduce a sawtooth voltage to amplifier 60. The output of amplifier 60 is fed to the resolver and to feedback resistor 61 which is a cosine wound potentiometer. The output tap 62 of potentiometer 61 is driven by the variable speed drive so that the actual amount of voltage that is negatively fed back to amplifier 60 is proportional to Cos $\theta$. In conventional feedback amplifiers:

$$Eout = Ein/(1-B)$$

where
Ein = input voltage
Eout = output voltage
B = feedback ratio or fraction of output voltage fed back to the input In the amplifier shown in FIG. 6, the feedback ratio B varies inproportion to Cos $\theta$ and therefore:

$$Eout = Ein/(1-\cos\theta)$$

which, of course, is the particular correction factor that is desired. The derivation of the correction factor $1/(1-\cos\theta)$ will now be described.

Referring to FIG. 7, assume that the unknown radar is at point O, an echo producing object is at point C, and the receiver of this invention is at point A. R denotes the actual range from the radar to the target. Next assume that OA >> OC so that the receiver can be considered as being at either point A or point B with respect to point O. For this condition, OA approximately equals OB and AC approximately equals BC. Then the path difference to the receiver (hereinafter referred to as PD) between the unreflected "main bang" path and the echo path will be:

$$PD = OC + CA - OA$$

Or:

$$PD \cong OC + CB - OA$$

where $\cong$ means approximately equal to  (1)

Since:

$$OC = OD$$

Then:

$$PD \cong CB + OD - OA \qquad (2)$$

Further:

$$OA = OD + DA,$$

$$PD \cong CB + OD - OD - DA \cong CB - DA \qquad (3)$$

Now:

$$OE = OC \cos\theta = OD \cos\theta$$

Then:

$$DE = OD - OE = OD(1-\cos\theta)$$

And:

$$CB = DA + DE = DA + OD(1-\cos\theta) \qquad (4)$$

Substituting equation (4) in equation (3):

$$PD \cong DA + OD(1-\cos\theta) - DA$$

$$PD \cong OD(1-\cos\theta) \cong OC(1-\cos\theta) \qquad (5)$$

$$PD \cong R(1-\cos\theta) \qquad (6)$$

Thus it can be seen from equation (6) that the apparent radar-to-target range seen at the receiver need only be corrected by a factor of $1/(1-\cos\theta)$ to gain reasonably accurate range information when the distance between the radar and the receiver is large relative to the distance from the radar to the target. A general range correction equation could be determined by a more rigorous analysis of the geometry involved and the invention could obviously be modified to incorporate this range correction without departing from the scope of this invention. Furthermore, the system described herein could be advantageously utilized as a passive relay system for the radar map of a known or friendly radar.

As pointed out hereinbefore, there are many variations of the methods and apparatus for obtaining the desired information from the raw data contained in the received pulses and echoes within the spirit of this invention. For instance, one method might be used wherein the video output of the receiver is displayed on an oscilloscope with the sweep synchronized with the main power pulses. A camera could then be used to make a film strip record of the oscilloscope picture which could later be used to plot a map of the information contained in the received signals. By this method, of course, the main beam bursts would be sensed by detecting equipment or by directly observing the film strip, the frames between any two consecutive main beam bursts would be proportionally divided, then the echo information would be plotted as a function of the distance between main beam bursts. If it should be desired, of course, the range discrepancy due to path difference can be corrected by proportionally plotting the range information. Thus by this method a presentation of the desired information can be obtained by use of automatic tracing equipment or even by simple drafting techniques.

Another method according to this invention might be to use a recording device to produce a record of the output of receiver 11 on video tape. This video tape could be used at a later time to operate a system that might include the portions of the circuitry shown after receiver 11 in FIGS. 1, 4, and 5. Thus the video tape could be recorded in the air and returned to a ground installation where the received data could be converted into useful information of any desired form. This conversion could then be performed as often as might be desired so that the information contained in the received data can be carefully analyzed.

The methods and means of remote radar locating and/or parasitic surveillance as described or shown in the accompanying drawings is intended as being exemplary only and the invention is not intended to be limited thereto.

What I claim as my invention is:

1. Receiving apparatus capable of passively locating a remote emitting radar comprising, receiving means for intercepting and amplifying the pulses and echo signals from the radar so as to produce a video output, gate circuit means connected to receive said video output, gate control circuit means connected to energize said gate circuit means when reception of unreflected main power pulses from the emitting radar is anticipated so that the output of said gate circuit will be a series of pulses corresponding to said main power pulses, range sweep circuit means connected to receive said series of pulses from said gate circuit means and to produce a range sweep output for each of said pulses, indicator means connected to receive said range sweep output, circuit means designed to produce an azimuth sweep output in synchronization with each of said main power pulses received with maximum amplitude from the emitting radar, said azimuth sweep circuit means being connected so as to introduce said azimuth sweep output to said indicator means, and means for connecting said video output of said receiving means to said indicator means, said indicator means being designed to correlate said range sweep output, said azimuth sweep output, and said video output so as to present an indication representative of the radar map that could be observed at the emitting radar whereby the location of the emitting radar can be passively determined and the area surrounding the radar can be kept under passive surveillance.

2. Receiving apparatus capable of passively locating a remote emitting radar comprising, antenna means for intercepting the pulses and echo signals from the radar, amplifying means connected to sense and amplify the signals intercepted by said antenna means to produce a video output, gate circuit means connected to receive said video output, gate control circuit means for producing gating pulses to energize said gate circuit means when reception of main power pulses from the emitting radar is anticipated so that the output of said gate circuit means will be a series of pulses corresponding to said main power pulses, means for introducing said series of pulses to said gate control circuit means to maintain the production of said gating pulses, range sweep circuit means connected to be activated by said series of pulses to generate a range sweep output for each said main power pulses, circuit means designed to produce an azimuth sweep output in synchronization with each of said main power pulses received with maximum amplitude from the emitting radar, indicator means connected to receive and correlate said azimuth sweep output, said range sweep output, and said video output so as to produce an indication representative of the radar map that could be seen at the emitting radar whereby the location of the emitting radar can be passively determined and the area surrounding the radar can be kept under passive surveillance.

3. Receiving apparatus in accordance with claim 2 in which said indicator means correlates the range, azimuth and video information received thereby so as to present said video information on a graphical plot of said range information against said azimuth information.

4. Receiving apparatus in accordance with claim 2 in which said indicator means correlates the range, azimuth and video information received thereby so as to form circularly oriented plan-position presentation.

5. Receiving apparatus capable of passively locating a remote emitting radar comprising, antenna means for intercepting the pulses and echo signals from the radar, amplifying means connected to sense and amplify the signals intercepted by said antenna means to produce a video output, gate circuit means connected to receive said video output, pulse generator circuit means for producing narrow gating pulses to energize said gate circuit means during the time that reception of main power pulses from the emitting radar is anticipated so that the output of said gate circuit means will be a series of pulses corresponding to said main power pulses, means for introducing said series of pulses to said pulse generator circuit means to supply trigger signals therefor so as to maintain the production of said narrow gating pulses, range sweep circuit means connected to be actuated by said series of pulses to generate a range sweep output for each of said main power pulses, resolver means connected to receive said range sweep output and to divide said range sweep output into sine and cosine components, driving means for said resolver means for varying the division of said range sweep output in direct proportion to the azimuth sweep rate of the emitting radar so that said sine and cosine components will vary as a function of said azimuth sweep rate, and means connected to receive said sine and cosine components and said video output to form a circularly oriented plan position presentation whereby the location of the emitting radar can be passively determined and the area surrounding the radar can be kept under passive surveillance.

6. Receiving apparatus in accordance with claim 5 which includes comparator circuit means connected to receive said series of pulses and said narrow gating pulses and to sense the phase difference therebetween so as to produce an output signal proportional to said phase difference, said comparator means being connected to introduce said phase difference output signal to said pulse generator circuit means to maintain the proper phase relation for said narrow gating pulses.

7. Receiving apparatus in accordance with claim 5 which includes compensating circuit means connected between said range sweep circuit means and said resolver means, the input of said compensating circuit means being said range sweep output, said compensating circuit means being designed to modify said range sweep to compensate for the difference in path lengths between said main power pulses and said echo signals, the compensated said range sweep being connected to said resolver, whereby relatively accurate range information will be available on said circularly oriented plan position presentation.

8. Receiving apparatus in accordance with claim 5 which includes acquisition circuit means designed to determine the pulse repetition rate of the emitting radar and to initiate the operation of said pulse generator circuit means in accordance with said pulse repetition rate.

9. Receiving apparatus capable of passively locating a remote emitting radar comprising, antenna means for intercepting pulses and echo signals from the radar, first circuit means connected to sense and amplify the signals intercepted by said antenna means so as to produce a video output, gate circuit means connected to receive said video output, pulse generator means for producing narrow gating pulses to energize said gate circuit means during the time that reception of main power pulses from the emitting radar is anticipated so that the output of said gate circuit means will be a series of pulses corresponding to said main power pulses, said series of pulses being introduced to said pulse generator means to supply triggers therefor so as to maintain the production of said narrow gating pulses, first comparator means for producing an output signal proportional to the phase difference between said series of pulses and said narrow gating pulses, said phase difference output signal being introduced to said pulse generator in order to correct the phase of said narrow gating pulses until said gating pulses are in phase with said series of pulses, acquisition circuit means designed to determine the pulse repetition rate of the emitting radar and to initiate operation of said pulse generator means in accordance with said pulse repetition rate, range sweep generator means connected to receive said series of pulses and to generate a range sweep for each of said main power pulses, range compensator means coupled to receive said range sweep, said range compensator means designed to modify said range sweep to compensate for the difference in path lengths between said main power pulses and said echo signals, resolver means connected to receive said compensated range sweep and to divide said compensated range sweep into sine and cosine components, variable speed driving means coupled to said resolver means in order to vary said sine and cosine components in direct proportion to the azimuth sweep rate of said emitting radar, and second circuit means connected to receive said sine and cosine components and said video output to form a circularly oriented plan position presentation having substantially accurate range information thereon, whereby the location of the emitting radar can be passively determined and the area surrounding the radar can be kept under passive surveillance.

10. Receiving apparatus in accordance with claim 9 which includes reference pulse circuit means to produce a first reference pulse for each cycle of variation of said sine and cosine components, detector means coupled to said gate circuit means to produce a second reference pulse for each of said main power pulses received with maximum amplitude from the radar, and error correction circuit means connected to receive said first and second reference pulses and to compare the phase of said pulses so as to correct said variable speed driving means until said reference pulses are in phase.

11. Receiving apparatus in accordance with claim 9 in which said range compensator means modifies said range sweep by a factor of $1/(1-\text{Cos})\ \theta$ where $\theta$ is the angle subtended between the radar to said receiving apparatus and the radar to echo producing object lines.

12. A system for producing a representation of the area illuminated by a remote emitting radar which comprises, means for receiving unreflected pulses and the reflected signals of the emitting radar so as to produce video information, means for producing a range sweep at a frequency that is proportional to the pulse repetition rate of the radar, means for producing an azimuth sweep in proportion to the azimuth scanning rate of the radar, means for correlating said range sweep, said azimuth sweep and said video information in order to produce a representation of the area illuminated by the emitting radar whereby the location of the emitting radar can be ascertained from said representation.

13. A system in accordance with claim 12 which includes means for correcting said range sweep in order to provide substantially accurate range information for said presentation.

14. A system for locating a remote emitting radar at a receiving location which comprises, means for receiving the unreflected pulses and reflected signals of the emitting radar, means for converting the received said unreflected pulses and reflected signals to a video signal, means for amplifying said video signal, means for triggering a range sweep for each main power pulse received from the radar, means for synchronizing an azimuth sweep with the said main power pulses received with maximum amplitude, means for correlating said range sweep, said azimuth sweep and said received pulses and echo signals to produce an indication of the location of the emitting radar and the area surrounding the radar.

15. A system in accordance with claim 14 which includes means for correcting said range sweep by a factor of $1/(1-\text{Cos }\theta)$ where $\theta$ is the angle subtended between lines defined by the emitting radar, echo producing objects, and the receiving location.

16. The method of producing a representation of the area illuminated by a remote emitting radar which comprises, receiving the unreflected power pulses and the reflected signals of the emitting radar so as to produce video information, recording said video information, sensing the main beam bursts on said recording, dividing said recording into proportionate segments between at least two consecutively occurring said main beam bursts, sensing the echo information on said recording, and plotting said echo information against said proportionate segments to produce a graphical representation, whereby said graphical representation will correspond to the area illuminated by the radar.

17. The method according to claim 16 which includes the step of correcting the apparent range of said reflected signals in proportion to the range error resulting from the differences in path length between said unreflected power pulses and said reflected signals.

18. The method of producing a representation of the area illuminated by a remote radar which comprises, receiving the unreflected power pulses and the reflected signals of the emitting radar so as to produce video information, recording said video information, sensing the repetition rate of said unreflected power pulses on said recording to produce a range sweep in proportion to said repetition rate, sensing the main beam bursts of said unreflected power pulses on said recording to produce an azimuth sweep in synchronization therewith, and correlating said range sweep, said azimuth sweep, and said video information to produce a graphical plot representative of the area and targets illuminated by the emitting radar whereby the location of the emitting radar can be ascertained from said graphical plot.

19. The method in accordance with claim 18 which includes the step of correcting the said graphical plot to compensate for path length differences of said reflected signals with respect to said unreflected power pulses.

20. Receiving apparatus capable of passively locating a remote emitting radar comprising, receiving means for intercepting the pulses and echo signals from the radar and for converting the received pulses and echos into a video output, means for producing a first series of pulses having a repetition rate substantially the same as the repetition rate of the main power pulses of the radar, means for producing a second series of pulses at a repetition rate substantially the same as the repetition rate of the maximum amplitude main power pulses received from the radar, and means for correlating said video output, said first series of pulses and said second series of pulses into a representation of the radar map that could be seen at the emitting radar.

* * * * *